US012755664B2

(12) United States Patent
Hsieh et al.

(10) Patent No.: US 12,755,664 B2
(45) Date of Patent: Oct. 6, 2026

(54) COLOR GAMUTS OF DISPLAY DEVICES

(71) Applicant: Hewlett-Packard Development Company, L.P., Spring, TX (US)

(72) Inventors: Hsing-Hung Hsieh, Taipei (TW); Gregory Staten, Spring, TX (US); Syed S. Azam, Spring, TX (US); Thong Thai, Spring, TX (US); Mario E. Campos, Spring, TX (US); Super Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/570,621

(22) PCT Filed: Jun. 29, 2021

(86) PCT No.: PCT/US2021/039654

§ 371 (c)(1),
(2) Date: Dec. 14, 2023

(87) PCT Pub. No.: WO2023/277885

PCT Pub. Date: Jan. 5, 2023

(65) Prior Publication Data

US 2024/0290238 A1 Aug. 29, 2024

(51) Int. Cl.
*G09G 3/20* (2006.01)

(52) U.S. Cl.
CPC ... *G09G 3/2003* (2013.01); *G09G 2320/0242* (2013.01); *G09G 2320/0666* (2013.01)

(58) Field of Classification Search
CPC ... G09G 2320/0242; G09G 2320/0666; G09G 3/2003; G09G 2340/06; G09G 5/02; G09G 3/32; H04N 9/67
See application file for complete search history.

(56) References Cited

U.S. PATENT DOCUMENTS

| | | | | |
|---|---|---|---|---|
| 6,369,827 B1 | 4/2002 | Ghali et al. | | |
| 7,365,755 B2 * | 4/2008 | Tin | H04N 1/6058 358/1.9 | |
| 7,486,304 B2 | 2/2009 | Bergquist et al. | | |
| 7,525,550 B2 | 4/2009 | Shioda et al. | | |
| 7,649,657 B2 * | 1/2010 | Kwak | G09G 5/02 358/1.9 | |

(Continued)

FOREIGN PATENT DOCUMENTS

| | | | |
|---|---|---|---|
| CN | 101494039 A * | 7/2009 | |
| CN | 111968570 A * | 11/2020 | G09G 3/2051 |

(Continued)

OTHER PUBLICATIONS

CN 111968570; Nov. 20, 2020 (English Translation).*

*Primary Examiner* — Ricardo Osorio

(74) *Attorney, Agent, or Firm* — Quarles & Brady LLP

(57) ABSTRACT

In some examples, a non-transitory machine-readable medium stores machine-readable instructions. When executed by a controller, the machine-readable instructions cause the controller to drive a first subset of multiple light sources of a display device using a first color gamut matrix and drive a second subset of the multiple light sources of the display device using a second color gamut matrix. A light source of the second subset is a same type of light source as a light source of the first subset.

17 Claims, 6 Drawing Sheets

(56) References Cited

U.S. PATENT DOCUMENTS

| | | | | |
|---|---|---|---|---|
| 8,274,700 | B2 * | 9/2012 | Tin | H04N 1/603 358/1.9 |
| 8,654,141 | B2 | 2/2014 | Zhang et al. | |
| 8,659,609 | B2 | 2/2014 | Inuzuka | |
| 9,779,691 | B2 | 10/2017 | Peana | |
| 10,390,029 | B2 * | 8/2019 | Ye | G06T 9/40 |
| 10,554,862 | B2 * | 2/2020 | Wang | H04N 9/64 |
| 10,613,385 | B2 | 4/2020 | Chen | |
| 10,979,601 | B2 * | 4/2021 | Froehlich | H04N 1/6058 |
| 11,120,725 | B2 * | 9/2021 | Aly | G09G 5/005 |
| 2006/0119870 | A1 * | 6/2006 | Ho | H04N 1/6058 358/1.9 |
| 2009/0141039 | A1 * | 6/2009 | Ramanath | G09G 3/346 345/590 |
| 2009/0154798 | A1 * | 6/2009 | Mizukura | H04N 1/6058 382/162 |
| 2013/0286287 | A1 | 10/2013 | Fujiwara et al. | |
| 2014/0292834 | A1 * | 10/2014 | Ando | G09G 3/2022 345/690 |
| 2020/0027386 | A1 | 1/2020 | Wang et al. | |

FOREIGN PATENT DOCUMENTS

| | | | | |
|---|---|---|---|---|
| CN | 114115619 | A * | 3/2022 | G06F 3/0481 |
| EP | 2551841 | A1 | 1/2013 | |
| JP | 2010183232 | A * | 8/2010 | |
| JP | 2013131921 | A * | 7/2013 | |
| WO | 2004/105381 | A1 | 12/2004 | |
| WO | WO-2015022274 | A1 * | 2/2015 | G06T 5/50 |
| WO | WO-2016163102 | A1 * | 10/2016 | H04N 1/488 |

* cited by examiner

COLOR GAMUTS OF DISPLAY DEVICES

BACKGROUND

Electronic devices such as televisions, notebooks, laptops, desktops, tablets, and smartphones are equipped with display devices. The display devices display images, such as documents, pictures, and videos, through display panels. The range of colors within a visible color spectrum that can be utilized to display the images on the display devices is referred to as a color gamut.

BRIEF DESCRIPTION OF THE DRAWINGS

Various examples are described below referring to the following figures.

DETAILED DESCRIPTION

Figure 1:
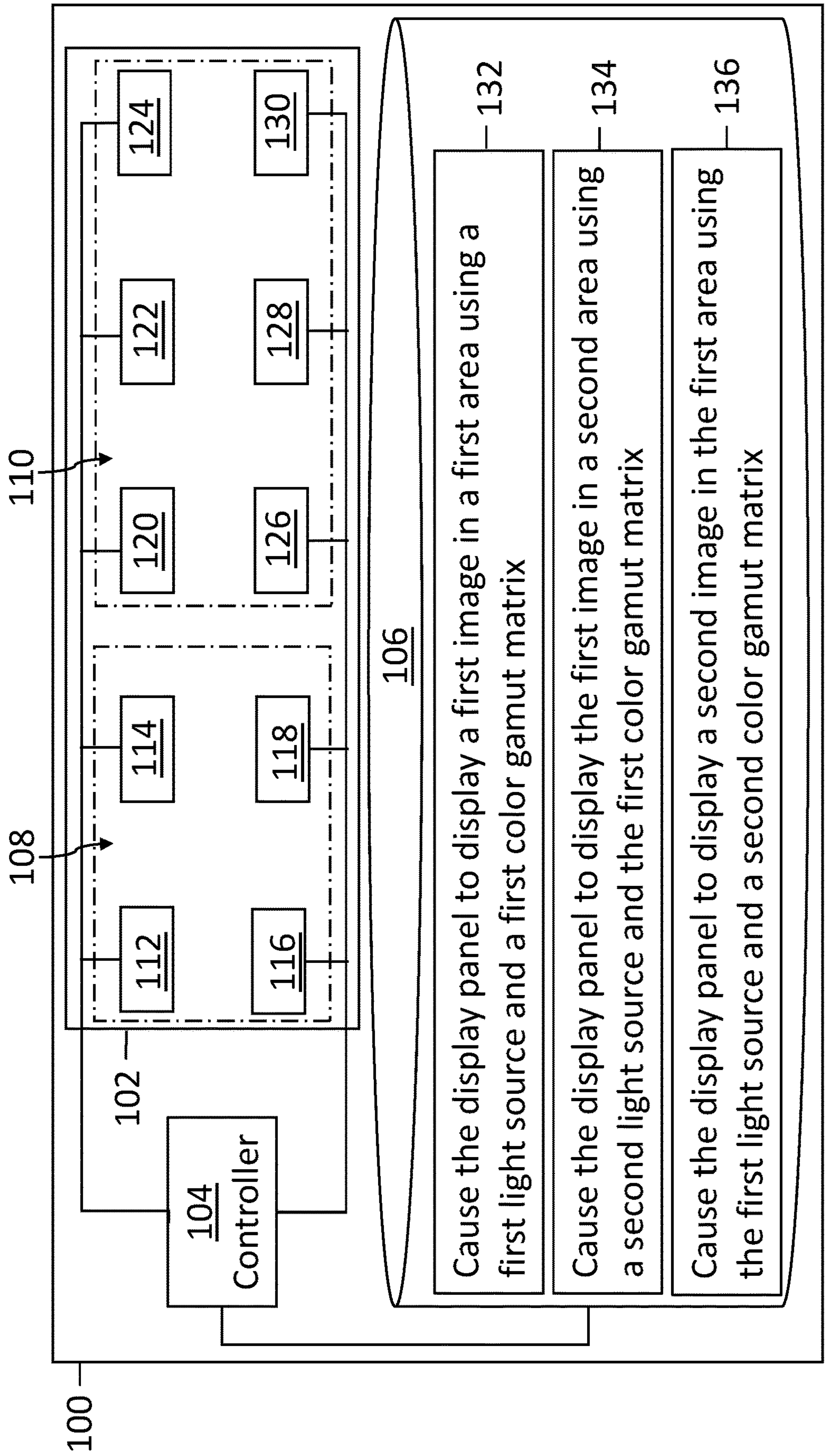
FIG. 1 is a schematic diagram of a display device for displaying multiple color gamuts simultaneously in accordance with various examples.

As described above, display devices display images utilizing color gamuts. A display device may operate according to a color gamut standard. Different color gamuts are governed by different color gamut standards. The different color gamut standards may include National Television Standards Committee (NTSC) 45%, NTSC 72%, standard Red Green Blue (sRGB), ADOBE® Red Green Blue (ADOBE® RGB), ADOBE® Wide Gamut Red Green Blue (ADOBE® Wide Gamut RGB), Digital Cinema Initiatives—Protocol 3 (DCI-P3), International Telecommunication Union (ITU) BT.2020, ITC BT.709, Society of Motion Picture and Television Engineers-C(SMPTE-C), European Broadcasting Union (EBU), or other suitably appropriate standards governing color gamuts. The different color gamut standards define different ranges of colors within the visible color spectrum. A wide-spectrum color gamut, as used herein, is a color gamut standard that supports a higher percentage of the colors within the visible color spectrum in comparison to another color gamut. An image may be created utilizing a different color gamut standard than the color gamut standard utilized by the display device. The image may be created utilizing ADOBE® RGB and displayed on a display device utilizing sRGB. ADOBE® RGB is a wide-spectrum color gamut in comparison to sRGB because ADOBE® RGB defines a higher percentage of the colors within the visible color spectrum than sRGB. The different color gamut standards utilized during the image creation and by the display device may result in an undesirable and unintended variation of the colors of the image when displayed on the display device. The variation of the colors may be variations of hue, saturation, or brightness. When displaying a wide-spectrum color gamut image on a display device that supports a lower percentage of colors within the visible spectrum, colors of the image may appear less saturated, or vibrant, of a different hue, or shade, or less bright. Variation of the colors of the image may also differ between display devices utilizing different color gamut standards.

This description describes a display device that drives a light source according to multiple color gamut standards. A controller (e.g., a timing controller (TCON) of the display device or a graphics processing unit (GPU) of an electronic device coupled to the display device) receives an image file. The image file may be an image file for display in a window of an application (e.g., executable code that enables a user to perform a task). The image file describes an image as data within a grid of pixels. The data of a pixel of the grid of pixels has a color that is described by an original color gamut matrix and a target color gamut and has a coordinate that indicates a pixel of the display device to display a converted color gamut matrix. The original color gamut matrix describes the color in terms of a color base indicated by a color gamut of the original color gamut matrix. The color base, as used herein, is a set of values that describes a color within the visible color spectrum. The color base may be a set of values that describe the color in terms of red, green, blue (RGB); hue, saturation, lightness (HSL); hue, saturation, value (HSV), or any other color base that describes a color within the visible color spectrum. For example, an sRGB original color gamut matrix indicates the sRGB color gamut. The sRGB color gamut matrix describes a color in terms of the RGB color base of the sRGB color gamut. The original color gamut matrix may indicate a default color gamut of the display device. For example, the default color gamut of the display device may be DCI-P3 and the original color gamut matrix may describe the color in terms of the RGB color base of the DCI-P3 color gamut. The target color gamut may be based on a color gamut in which an image was created. For example, a user may have created the image utilizing the ADOBE® RGB color gamut. The controller determines a color conversion and generates a converted color gamut matrix. The converted color gamut matrix describes the color described by the original color gamut matrix in terms of bases for the target color gamut. The controller causes the display device to display the converted color gamut matrix at the coordinates that indicate the pixel of the display device to display the converted color gamut matrix. In some examples, the controller may cause the display device to display a first image of a first image file utilizing a first converted color gamut matrix in a first area having first coordinates indicated by the first image file and to simultaneously display a second image of a second image file utilizing a second converted color gamut matrix in a second area having second coordinates indicated by the second image file.

An electronic device comprising a display device that supports displaying images having different color gamuts in different areas of the display device improves color accuracy of the displayed images. The resulting color accuracy improves the user experience and allows for the creation of an image in one color gamut without requiring foreknowledge of an operational color gamut of a display device with which to later display the image.

In some examples in accordance with the present description, a non-transitory machine-readable medium is provided. Non-transitory includes all electronic mediums or media of storage, except signals. The non-transitory machine-readable medium stores machine-readable instructions. When executed by a controller, the machine-readable instructions cause the controller to drive a first subset of multiple light sources of a display device using a first color gamut matrix and drive a second subset of the multiple light sources of the display device using a second color gamut matrix, where a light source of the second subset is a same type of light source as a light source of the first subset.

In another example in accordance with the present description, a display device is provided. The display device comprises a display panel and a controller coupled to the display panel. The controller is to receive an original color gamut matrix and a target color gamut, where the target color gamut is a color gamut of multiple color gamuts. The controller is to determine a color conversion based on the original color gamut matrix and the target color gamut and generate a converted color gamut matrix based on the color conversion, where the converted color gamut matrix is based on the color gamut of the multiple color gamuts. The controller is to cause a light source of the display panel to display a pixel of an image using the converted color gamut matrix.

In another example in accordance with the present description, a display device is presented. The display device comprises a display panel having first and second areas, the first area having a first light source and the second area having a second light source, and a controller coupled to the display panel. The controller is to cause the display panel to display a first image in the first area using the first light source and a first color gamut matrix, cause the display panel to display the first image in the second area using the second light source and the first color gamut matrix, and cause the display panel to display a second image in the first area using the first light source and a second color gamut matrix.

Referring now to FIG. 1, a schematic diagram of a display device 100 for displaying multiple color gamuts simultaneously is depicted, in accordance with various examples. The display device 100 comprises a display panel 102, a controller 104, a storage device 106, and light sources 112, 114, 116, 118, 120, 122, 124, 126, 128, 130. The display device 100 may be a transmissive or an emissive display device. A transmissive display device 100 comprises light sources 112, 114, 116, 118, 120, 122, 124, 126, 128, 130 that are backlights that provide lights through color filters to display an image. An emissive display device 100 comprises lights sources 112, 114, 116, 118, 120, 122, 124, 126, 128, 130 that are pixels that generate colors to display an image. The display panel 102 may be a liquid crystal display (LCD) panel, a light-emitting diode (LED) panel, an organic LED (OLED) panel, a microLED panel, or any other suitable display panel for displaying multiple color gamuts simultaneously. The controller 104 may be a microprocessor, a microcomputer, a microcontroller, a programmable integrated circuit, a programmable gate array, or other suitable device for managing operations of the display device 100. The storage device 106 may be a hard drive, a solid-state drive (SSD), flash memory, random access memory (RAM), or other suitable memory device. The storage device 106 may store machine-readable instructions that, when executed by the controller 104, may cause the controller 104 to perform some or all of the actions attributed herein to the controller 104. The machine-readable instructions may be the machine-readable instructions 132, 134, 136, for example.

The lights sources 112, 114, 116, 118, 120, 122, 124, 126, 128, 130 may be a same type of light source. The same type of light source, as used herein, is a light source sharing operating characteristics that are equivalent to operating characteristics of another similar light source. The same type of light source may be an LED, an OLED, a microLED, a quantum dot (QD) LED (QD-LED), a QD-OLED, a QD-microLED, or any other suitable light source that supports a wide-spectrum color gamut. For example, the lights sources 112, 114, 116, 118, 120, 122, 124, 126, 128, 130 may be a same type of QD-LED. In another example, the lights sources 112, 114, 116, 118, 120, 122, 124, 126, 128, 130 may be a same type of QD-OLED. In yet another example, the lights sources 112, 114, 116, 118, 120, 122, 124, 126, 128, 130 may be a same type of microLED. The display panel 102 may comprise areas 108, 110. The light sources of the area 108 may be the light sources 112, 114, 116, 118. The light sources of the area 110 may be the light sources 120, 122, 124, 126, 128, 130.

In various examples, the light sources 112, 114, 116, 118, 120, 122, 124, 126, 128, 130 may define different areas. For example, the light sources 112, 116 may be light sources of a first area, the light sources 114, 118, 120, 126 may be light sources of a second area, and the light sources 122, 128, 124, 130 may be light sources of a third area. In another example, the light sources 112, 114, 116, 118, 120, 122, 124, 126, 128, 130 may be light sources of a single area. In yet another example, the light sources 112, 114, 116, 120, 122, 124, 130 may be a first area, and the light sources 118, 126, 128 may be a second area.

The controller 104 couples to the display panel 102, the storage device 106, and the light sources 112, 114, 116, 118, 120, 122, 124, 126, 128, 130. In various examples, when executed in a sequential manner by the controller 104, the machine-readable instructions 132, 134, 136 cause the display device 100 to display multiple color gamuts simultaneously on the display panel 102. By executing the machine-readable instruction 132, the controller 104 causes the display panel 102 to display a first image in a first area using a first light source and a first color gamut matrix. By executing the machine-readable instruction 134, the controller 104 causes the display panel 102 to display the first image in a second area using a second light source and the first color gamut matrix. For example, the second area may be the area 110 and the second light source may be a light source of the light sources 120, 122, 124, 126, 128, 130. By executing the machine-readable instruction 136, the controller 104 causes the display panel 102 to display a second image in the first area using the first light source and a second color gamut matrix.

In some examples, by executing the machine-readable instruction 132, the controller 104 causes the display panel 102 to display a first image in the area 108 using the light source 112 and a first color gamut matrix. The first color gamut matrix may be a sRGB color gamut matrix, for example. By executing the machine-readable instruction 134, the controller 104 causes the display panel 102 to display the first image in the area 110 using the light source 120 and the first color gamut matrix. By executing the machine-readable instruction 136, the controller 104 causes the display panel 102 to display a second image in the area 108 using the light source 112 and a second color gamut matrix. The second color gamut matrix may be a DCI-P3 color gamut matrix, for example. By executing the machine-readable instruction 136, the controller 104 may cause the display panel 102 to display the second image in the area 108 using the light source of the light sources 112, 114, 116, 118 and a second color gamut matrix.

Figure 2A:
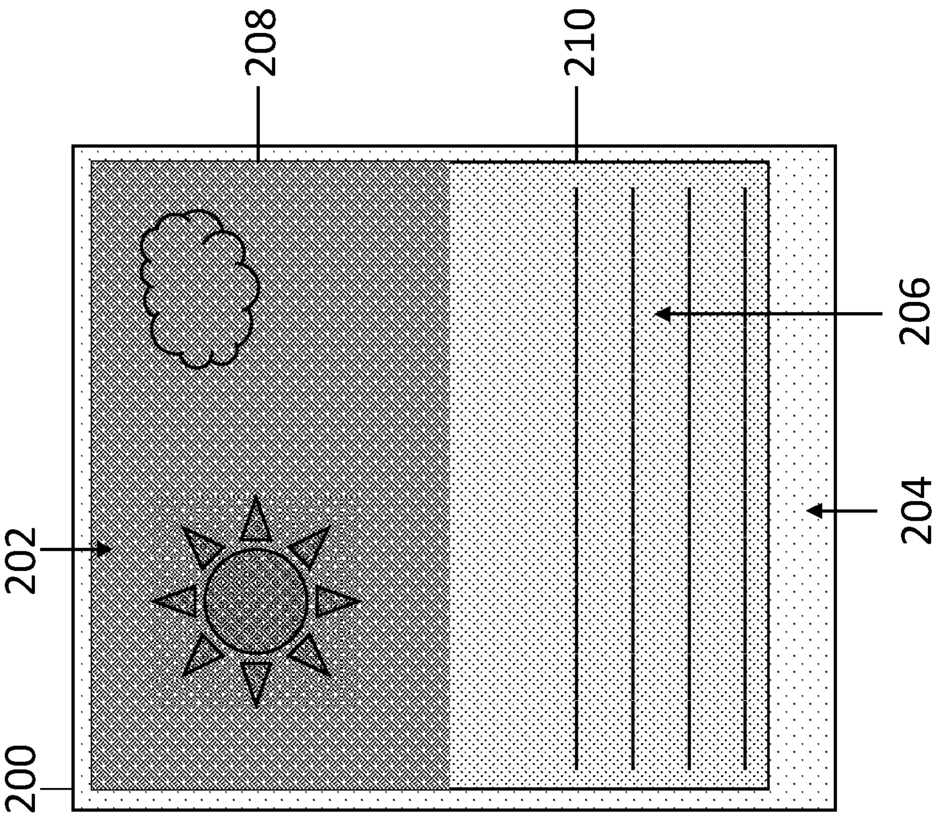
FIGS. 2A and 2B are examples of display devices displaying multiple color gamuts simultaneously in accordance with various examples.
Figure 2B:
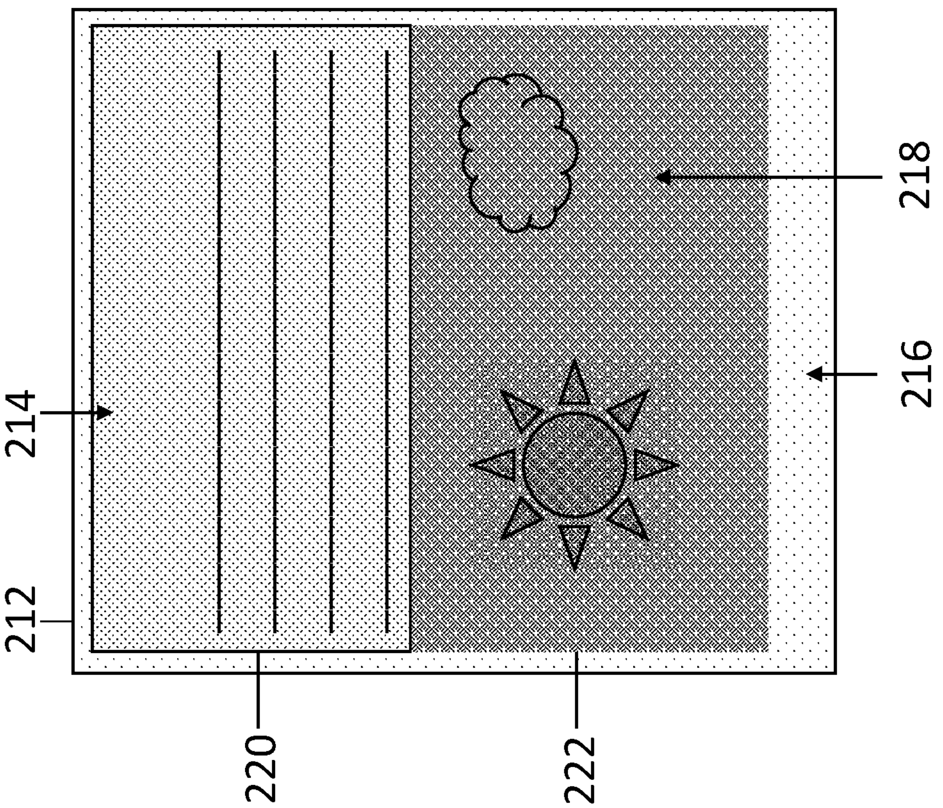

Referring now to FIGS. 2A and 2B, examples of display devices 200, 212 displaying multiple color gamuts simultaneously are depicted, in accordance with various examples. FIG. 2A includes the display device 200 having areas 202, 204, 206. The display device 200 may be the display device 100. The area 202 may be the area 108. The area 206 may be the area 110. The area 202 displays a color gamut indicated by a white-dotted dark gray background. The display device 200 displays an image 208 in the area 202, for example. The area 204 displays another color gamut indicated by a black-dotted white background. The display device 200 displays a background image in the area 204, for example. The area 206 displays yet another color gamut indicated by a black-dotted light gray background. The display device 200 displays an image 210 that is a graphical user interface (GUI) for a word processing application (e.g., executable code), for example.

FIG. 2B includes the display device 212 having areas 214, 216, 218. The display device 212 may be the display device 100, 200. The area 214 may be the area 108. The area 218 may be the area 110. The area 218 displays the color gamut indicated by a white-dotted dark gray background. The area 218 may be the area 206. The display device 212 displays an image 222 in the area 218, for example. The image 222 may be the image 208. The area 216 displays the another color gamut indicated by a black-dotted white background. The area 216 may be the area 204. The display device 212 displays a background image in the area 216, for example. The area 214 displays the yet another color gamut indicated by a black-dotted light gray background. The area 214 may be the area 202. The display device 212 displays an image 220 that is a graphical user interface (GUI) for a word processing application, for example.

In some examples, the display device 200 illustrates a first time period during which a controller (e.g., the controller 104) may cause a display panel (e.g., the display panel 102) of the display device 200 to display a first image (e.g., the image 208) in a first area (e.g., the area 202) using a first light source (e.g., the light source 112, 114, 116, 118) and a first color gamut matrix. The first color gamut matrix may describe the color gamut indicated by the white-dotted gray background, for example. The display device 212 illustrates a second time period during which the controller may cause the display panel of the display device 212 (e.g., the display device 200) to display the first image (e.g., the image 208, 222) in a second area (e.g., the area 218, 206) using a second light source (e.g., the light source 120, 122, 124, 126, 128, 130) and the first color gamut matrix. The controller may cause the display panel of the display device 212 to display a second image (e.g., the image 220, 210) in the first area (e.g., the area 214, 202) using the first light source and a second color gamut matrix. The second color gamut matrix may describe the yet another color gamut indicated by black-dotted light gray background.

An electronic device comprising the display device 100, 200, 212 that supports displaying images (e.g., the images 208, 210) having different color gamuts in areas 108, 110, areas 202, 204, 206, areas 214, 216, 218, respectively, improves color accuracy of the displayed images. The resulting color accuracy improves the user experience and allows for the creation of images in one color gamut without requiring foreknowledge of an operational color gamut of the display device 100, 200, 212 with which to later display the image.

Figure 3:
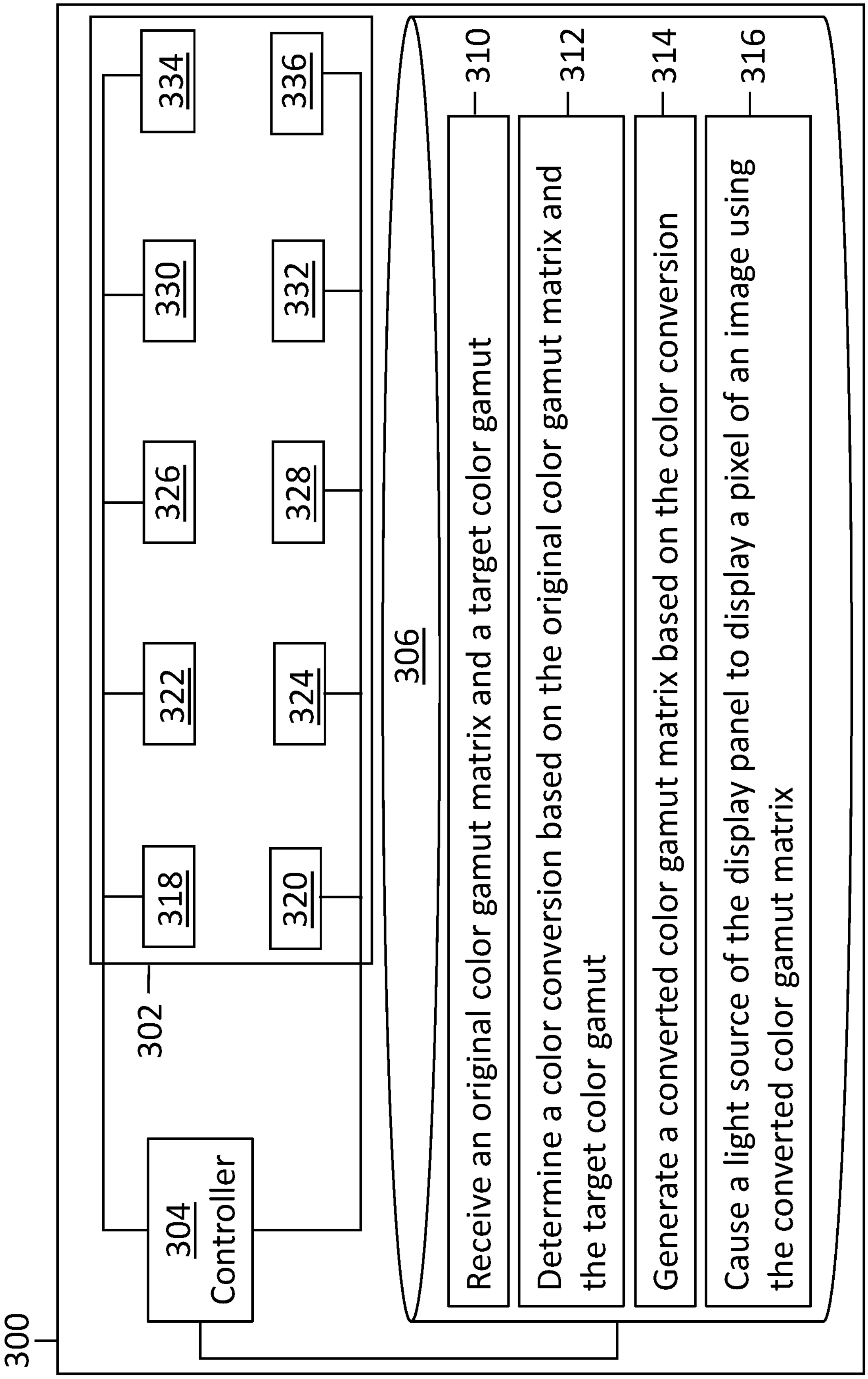
FIG. 3 is a schematic diagram of a display device for displaying multiple color gamuts simultaneously in accordance with various examples.

Referring now to FIG. 3, a schematic diagram of a display device 300 for displaying multiple color gamuts simultaneously is depicted, in accordance with various examples. The display device 300 may be the display device 100, 200, 212. The display device 300 comprises a display panel 302, a controller 304, a storage device 306, and multiple light sources 318, 320, 322, 324, 326, 328, 330, 332, 334, 336. The display panel 302 may be the display panel 102. The controller 304 may be the controller 104. The storage device 306 may be the storage device 106. The multiple lights sources 318, 320, 322, 324, 326, 328, 330, 332, 334, 336 may be the light sources 112, 114, 116, 118, 120, 122, 124, 126, 128, 130. As described above with respect to FIG. 1, the multiple light sources 318, 320, 322, 324, 326, 328, 330, 332, 334, 336 may be a same type of light source. For example, the multiple lights sources 318, 320, 322, 324, 326, 328, 330, 332, 334, 336 may be multiple QD-OLEDs that are the same type of QD-OLED.

The controller 304 couples to the display panel 302, the storage device 306, and the multiple light sources 318, 320, 322, 324, 326, 328, 330, 332, 334, 336. The storage device 306 may store machine-readable instructions that, when executed by the controller 304 may cause the controller 304 to perform some or all of the actions attributed herein to the controller 304. The machine-readable instructions may be the machine-readable instructions 310, 312, 314, 316, for example.

In various examples, when executed in a sequential manner by the controller 304, the machine-readable instructions 310, 312, 314, 316 cause the display device 300 to display multiple color gamuts simultaneously on the display panel 302. By executing the machine-readable instruction 310, the controller 304 receives an original color gamut matrix and a target color gamut. By executing the machine-readable instruction 312, the controller 304 determines a color conversion based on the original color gamut matrix and the target color gamut. By executing the machine-readable instruction 314, the controller 304 generates a converted color gamut matrix based on the color conversion. By executing the machine-readable instruction 316, the controller 304 causes a light source of the multiple light sources 318, 320, 322, 324, 326, 328, 330, 332, 334, 336 of the display panel 302 to display a pixel of an image using the converted color gamut matrix.

In various examples, by executing the machine-readable instruction 310, the controller 304 receives an original color gamut matrix and a target color gamut. For example, the original color gamut matrix may be a color gamut matrix describing a color of an sRGB color gamut. The target color gamut may be EBU. The controller 304 may receive the original color gamut matrix or the target color gamut from an electronic device coupled to the display device 300, for example. In another example, the controller 304 may receive the original color gamut matrix or the target color gamut via a network interface device (not expressly shown). By executing the machine-readable instruction 312, the controller 304 determines a color conversion based on the original color gamut matrix and the target color gamut. For example, the controller 304 may compare the target color gamut to the color gamuts of multiple Lookup Tables (LUTs) stored as data structures on the storage device 306 to determine a LUT for the color conversion. A data structure of a LUT of the multiple LUTs may be a three-dimensional (3D) table, a one-dimensional (1D) table utilized with a 3D table, two 1 D tables utilized with a three-by-three matrix, two 1 D tables utilized with a three-by-four matrix, or some other suitable data structure for converting from one color gamut to another color gamut. By executing the machine-readable instruction 314, the controller 304 generates a converted color gamut matrix based on the color conversion. For example, the controller 304 may generate the converted color gamut matrix based on the LUT for the color conversion. By executing the machine-readable instruction 316, the controller 304 causes a light source of the multiple light sources 318, 320, 322, 324, 326, 328, 330, 332, 334, 336 of the display panel 302 to display a pixel of an image using the converted color gamut matrix.

As described above, an image file comprises the data of a grid of pixels having colors that are described by multiple original color gamut matrices and a respective target color gamut of an original color gamut matrix of the multiple original color gamut matrices and that have coordinates that indicate pixels of the display device 300 to display multiple converted color gamut matrices associated with the multiple original color gamut matrices. The pixels of the display device 300 may be a subset of light sources of the multiple light sources 318, 320, 322, 324, 326, 328, 330, 332, 334, 336. The controller 304 may determine color conversions for the multiple original color gamut matrices based on the original color gamut matrices and the respective target color gamut associated with the original color gamut matrix of the multiple original color gamut matrices. The controller 304 may generate the multiple converted color gamut matrices based on the color conversions. The controller 304 may cause the subset of light sources of the multiple light sources 318, 320, 322, 324, 326, 328, 330, 332, 334, 336 of the display panel 302 that correspond to the coordinates of the image file to display the respective converted color gamut matrix.

In some examples, the controller 304 may receive first and second original color gamut matrices of multiple color gamut matrices, the first and the second original color gamut matrices associated with a first and second target color gamut, respectively, and a first coordinate and a second coordinate, respectively. For example, the first original color gamut matrix may be associated with a DCI-P3 target color gamut and the second original color gamut matrix may be associated with an sRGB target color gamut. By comparing the first coordinate and the second coordinate, the controller 304 may determine the first original color gamut matrix and the second original color gamut matrix are associated with a same pixel. Overlapping areas, as used herein, are areas of the display device 300 having pixels that correspond to coordinates associated with multiple original color gamut matrices. For example, the controller 304 may determine the first original color gamut matrix and the second original color gamut matrix are associated with a light source 328 of the multiple light sources 318, 320, 322, 324, 326, 328, 330, 332, 334, 336. The controller 304 may determine a priority for the first original color gamut matrix and the second original color gamut matrix. The controller 304 may determine the priority utilizing data of the image file, by comparing the first and the second target color gamut to determine which is a wide-spectrum color gamut, or, as described below with respect to FIG. 6, by determining whether the overlapping areas, or a portion thereof, are within the boundaries of an area having a fixed color gamut.

For example, the controller 304 may receive a first priority associated with the first original color gamut matrix and a second priority associated with the second original color gamut matrix and determine whether the first priority is higher than the second priority. The first original color gamut matrix may be for an active window of the display device 300 and may be associated with a value that indicates a highest priority (e.g., 1 on a scale of 1 to 10, where 1 indicates a highest priority). The second original color gamut matrix may be for a background window of the display device 300 and may be associated with a value that indicates a low priority (e.g., 3 on a scale of 1 to 10, where 10 indicates a highest priority). In another example, the controller 304 may determine that the first target color gamut has a wide-spectrum color gamut in comparison to the second target color gamut. Based on the wide-spectrum color gamut determination, the controller 304 may determine the first original color gamut matrix has a higher priority than the second original color gamut matrix. For example, the controller 304 may determine that the first original color gamut matrix associated with the DCI-P3 target color gamut has a higher priority than the second original color gamut matrix associated with the sRGB target color gamut. The controller 304 may determine a color conversion and generate a converted color gamut matrix for an original color gamut matrix of the multiple color gamut matrices having the higher priority. For example, the controller 304 may determine a color conversion and generate a converted color gamut matrix for the first original color gamut matrix associated with the DCI-P3 target color gamut. The controller 304 causes the display device 300 to display the converted color gamut matrix at the coordinates.

Figure 4:
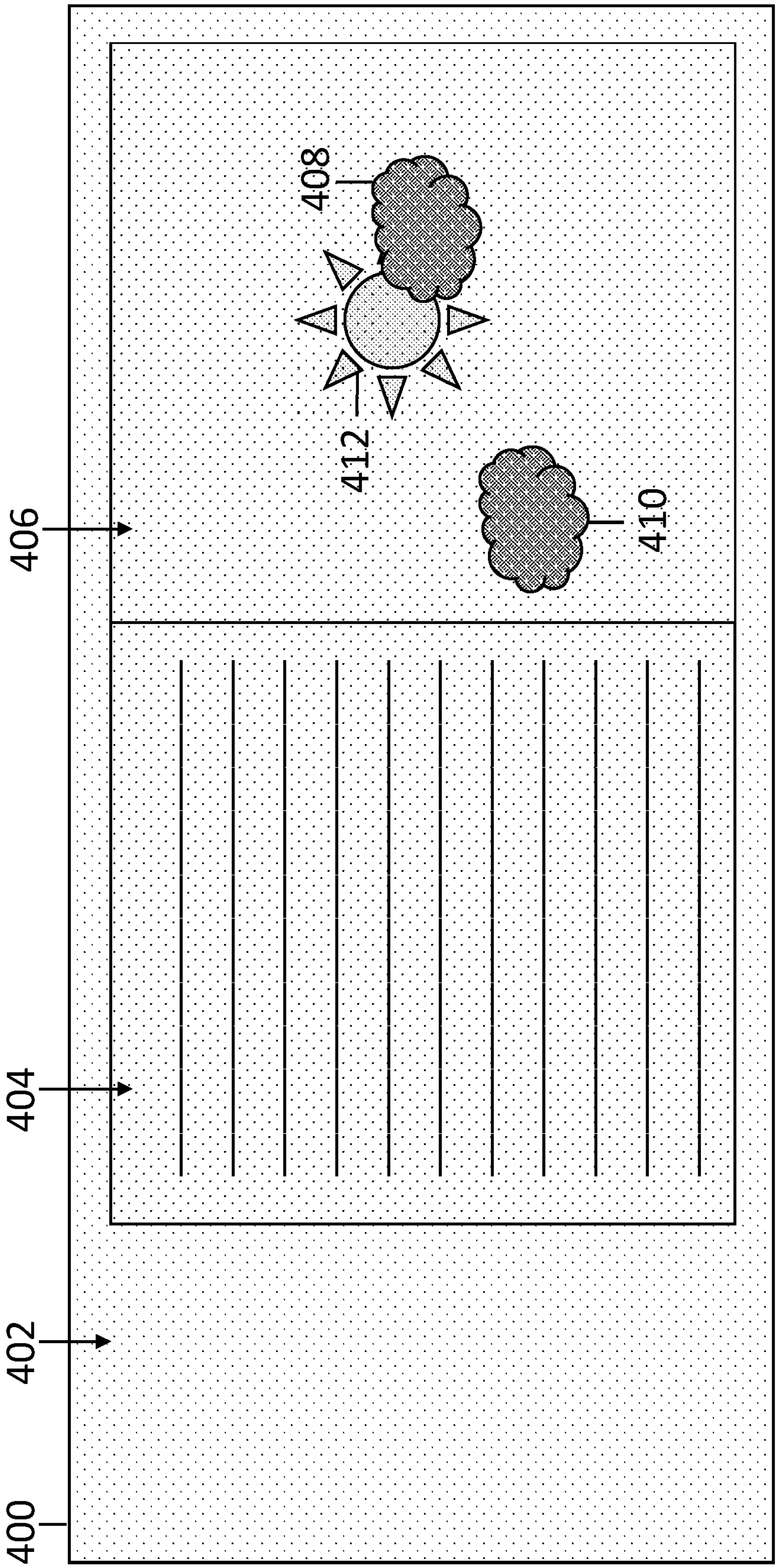
FIG. 4 is an example of a display device displaying multiple color gamuts simultaneously in accordance with various examples.

Referring now to FIG. 4, an example of a display device 400 displaying multiple color gamuts simultaneously is depicted, in accordance with various examples. The display device 400 may be the display device 100, 200, 212, 300. The display device 400 comprises areas 402, 404, 406. The area 402 represents a first area having a first color gamut. The area 402 may be an sRGB color gamut for a background image of the display device 400, for example. The area 404 represents a second area having the first color gamut. The area 404 may be an area for displaying a GUI of a word processing application, for example. The area 404 may be displayed based on a first image file for displaying the GUI of the word processing application. The area 406 represents a third area having multiple color gamuts. The area 406 may be an area for displaying a portable document format (PDF) file, for example. The area 406 may be displayed based on a second image file for displaying the PDF file. The PDF file may include images 408, 410, 412, for example. In some examples, the areas 404, 406 may be referred to herein as non-overlapping layers because boundaries of the areas, as established by windows of the applications, do not overlap.

In some examples, the PDF file may include multiple layers, a layer of the multiple layers having a target color gamut. For example, a background layer of the PDF file may have a first target color gamut that is equivalent to the first color gamut of the areas 402, 404. A second layer of the PDF file comprising the image 412 may have a second target color gamut that is different than the first target color gamut as indicated by the black-dotted light gray background. A third layer of the PDF file comprising the images 408, 410 may have a third target color gamut that is different than the first and second target color gamuts as indicated by the white-dotted dark gray background. A layer of the PDF file may have a priority. A controller (e.g., the controller 104, 304) may determine a layer having the highest priority.

For example, the controller may determine the third layer of the PDF file has the highest priority. The controller may determine color conversions for multiple original color gamut matrices associated with the highest priority layer. The controller may generate multiple converted color gamut matrices for the multiple original color gamut matrices associated with the highest priority layer. The controller may determine another layer having the second highest priority. For example, the controller may determine the second layer of the PDF file has the second highest priority. The controller may determine non-overlapping areas of the layer having the highest priority and the second highest priority. The controller may determine color conversions for multiple original color gamut matrices associated with the second highest priority layer and the non-overlapping areas of the first and the second layers. The controller may generate multiple converted color gamut matrices for the multiple original color gamut matrices associated with the highest priority layer and the non-overlapping areas of the first and the second layers. The controller may determine the background layer of the PDF file has the lowest priority. The controller may determine non-overlapping areas of the background layer and the first and the second layers. The controller may determine color conversions for multiple original color gamut matrices associated with the background layer and the non-overlapping areas of the background layer and the first and the second layers. The controller may generate multiple converted color gamut matrices for the multiple original color gamut matrices associated with the lowest priority layer and the non-overlapping areas of the background layer and the first and the second layers. The controller may cause the display device 400 to display the converted color gamut matrices for the background, the first, and the second layers.

For example, the controller may cause the display device 400 to display the images 408, 410 having the multiple converted color gamut matrices associated with the highest priority layer, the image 412 having the multiple converted color gamut matrices associated with the second highest priority layer and the non-overlapping areas of the first and the second layers, and the background image having the multiple converted color gamut matrices associated with the lowest priority layer and the non-overlapping areas of the background layer and the first and the second layers. For example, the overlapping areas of the images 408, 412 represent the target color gamut associated with the image 408, the overlapping areas of the image 410 and the background image represent the target color gamut associated with the image 410, and the overlapping areas of the image 412 and the background image represent the target color gamut associated with the image 412.

In other examples, the images 408, 410 may be referred to as a first portion of the area 406, the image 412 may be referred to as a second portion of the area 406, and a third portion of the area 406 is a remaining portion of the area 406. The controller may cause the display device 400 to display a set of pixels of the third portion of the area 406 using a first light source and a first color gamut matrix, as indicated by the black-dotted white background. The controller may cause the display device 400 to display a set of pixels of the images 408, 410 in the first portion of the area 406 using a second light source and a second color gamut matrix, as indicated by the white-dotted dark gray background. The controller may cause the display device 400 to display a set of pixels of the image 412 in the second portion of the area 406 using a third light source and a third color gamut matrix, as indicated by the black-dotted light gray background.

An electronic device comprising the display device 300, 400 that supports displaying images having different color gamuts based on priorities for different areas of the display device 300, 400 improves color accuracy of the displayed images. The resulting color accuracy improves the user experience and allows for the creation of images in one color gamut without requiring foreknowledge of an operational color gamut of the display device 300, 400 with which to later display the image.

Figure 5:
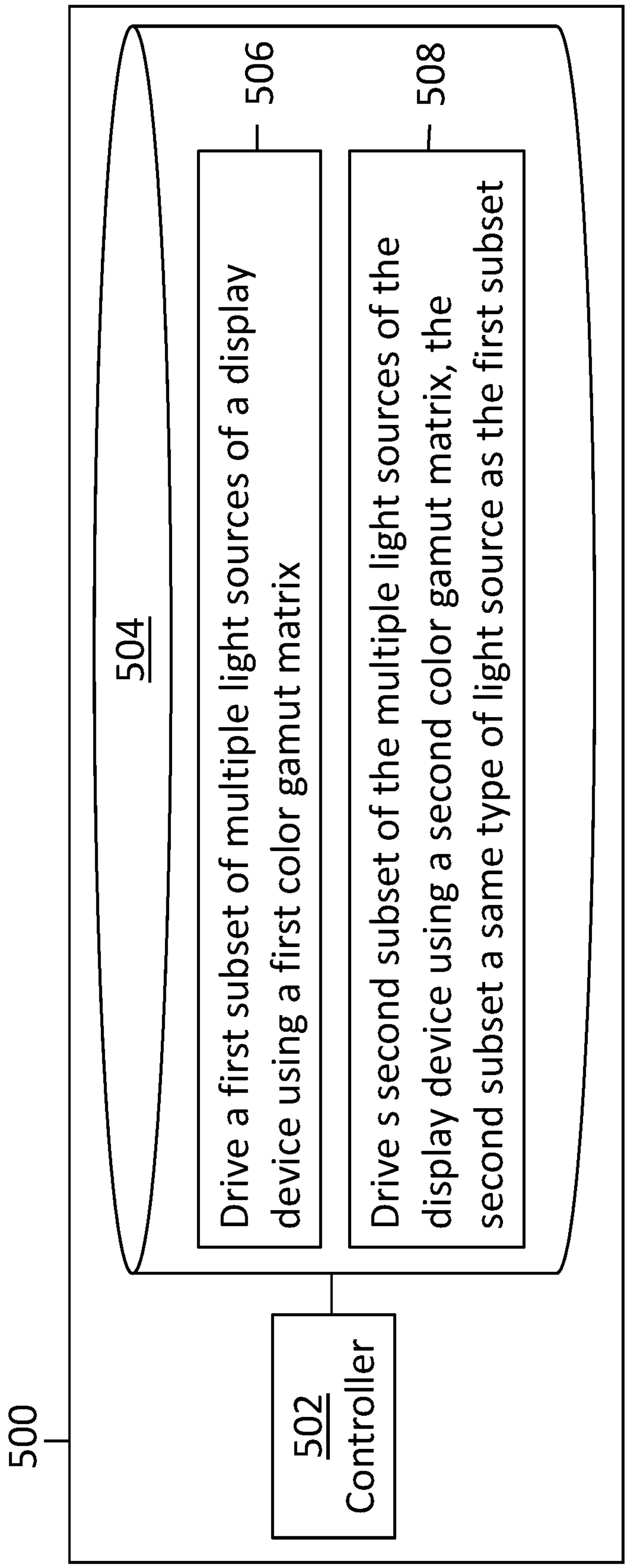
FIG. 5 is a schematic diagram of a display device for displaying multiple color gamuts simultaneously in accordance with various examples.

Referring now to FIG. 5, a schematic diagram of a display device 500 for displaying multiple color gamuts simultaneously is depicted, in accordance with various examples. The display device 500 may be the display device 100, 200, 212, 300, or 400. The display device 500 comprises the controller 502 and the non-transitory machine-readable medium 504. The non-transitory machine-readable medium 504 may be the storage device 106, 306. As described above, the term "non-transitory" does not encompass transitory propagating signals.

In various examples, the display device 500 comprises the controller 502 coupled to the non-transitory machine-readable medium 504. The non-transitory machine-readable medium 504 may store machine-readable instructions. The machine-readable instructions may be the machine-readable instructions 506, 508, for example. The machine-readable instructions 506, 508, when executed by the controller 502, may cause the controller 502 to perform some or all of the actions attributed herein to the controller 502. The controller 502 may execute the machine-readable instructions 506, 508 in a sequential or a random manner.

In various examples, when executed by the controller 502, the machine-readable instructions 506, 508 cause the display device 500 to display multiple color gamuts on the display device 500. By executing the machine-readable instruction 506, the controller 502 drives a first subset of multiple light sources (e.g., the light sources 112, 114, 116, 118, 120, 122, 124, 126, 128, 130, 318, 320, 322, 324, 326, 328, 330, 332, 334, 336) of the display device 500 using a first color gamut matrix. By executing the machine-readable instruction 508, the controller 502 drives a second subset of the multiple light sources of the display device 500 using a second color gamut matrix. A light source of the second subset is a same type of light source as a light source of the first subset.

As described above with respect to FIG. 1, the multiple light sources (e.g., the light sources 112, 114, 116, 118, 120, 122, 124, 126, 128, 130) may be for a transmissive or an emissive display device 500. The first subset of the multiple light sources may be for a first area (e.g., the area 108, 110, 202, 204, 206, 214, 216, 218, 402, 404, 406) of the display device 500. The second subset of the multiple light sources may be for a second area of the display device 500. The first and the second subsets of the multiple light sources may be a same type of LED, OLED, microLED, QD-LED, QD-OLED, QD-microLED, or any other suitable light source supporting wide-spectrum color gamuts simultaneously. For example, the first and the second subsets of the multiple light sources may be the same type of LED. In another example, the first and the second subsets of the multiple light sources may be the same type of OLED. In yet another example, the first and the second subsets of the multiple light sources may be the same type of QD-microLED.

Figure 6:
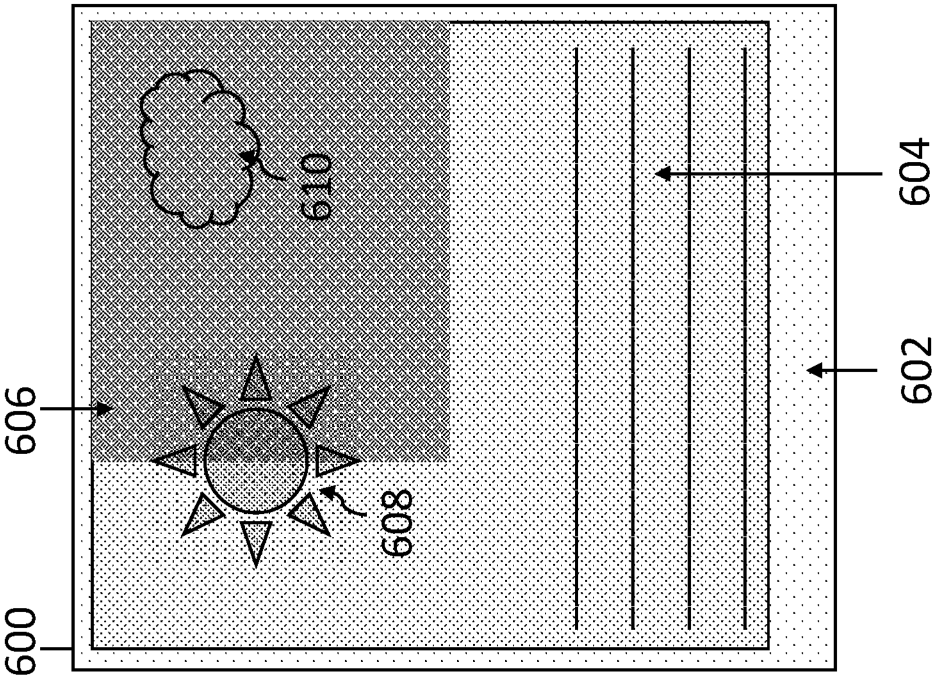
FIG. 6 is an example of a display device displaying multiple color gamuts simultaneously in accordance with various examples.

Referring now to FIG. 6, an example of a display device 600 displaying multiple color gamuts simultaneously is depicted, in accordance with various examples. The display device 600 may be the display device 100, 200, 212, 300, 400, 500. The display device 600 comprises areas 602, 604, 606. The area 602 may represent a first area having a first color gamut as indicated by the black-dotted white background. The area 602 may be an sRGB color gamut for a background image of the display device 600, for example. The area 604 may represent a second area having a second color gamut as indicated by the black-dotted light gray background. The area 604 may be an ADOBE® RGB color gamut for a portable document format (PDF) file, for example. The PDF file may include images 608, 610, for example. The area 606 may represent a third area having a third color gamut as indicated by the white-dotted dark gray background. In some examples, the area 604 may represent a first window of an application and the area 606 may represent a second window of the application. For example, the images 608, 610 may be for display in the area 606 and text of the PDF file may be for display in the area 604.

In other examples, the area 606 may be an area having a fixed location on the display device 600. A fixed location, as used herein, defines a region whose boundaries remain stationary relative to a display panel (e.g., the display panel 102, 302). The fixed location may have a fixed color gamut. A fixed color gamut, as used herein, is an area of the display device 600 having a color gamut that remains the same, regardless of a target color gamut of an image file. For example, the area 606 may have a DCI-P3 color gamut. The fixed location of the area 606 may be rectangular in shape. In other examples, the fixed location of the area 606 may be triangular, circular, elliptical, an area between two concentric circles, or any other two-dimensional (2D) shape. In various examples, a user may define boundaries of the fixed location. For example, the user may divide an image between two different color gamuts to determine an appearance of the image in the two different color gamuts. A first area (e.g., the area 604) of the application may display a first portion of the image utilizing a NTSC 72% color gamut and a second area (e.g., the area 606) of the application may display a second portion of the image utilizing a DCI-P3 color gamut. In some examples, the boundaries of the fixed location may define an irregular 2D shape.

As described above with respect to FIG. 3, in some examples, the controller may receive multiple original color gamut matrices. An original color gamut matrix of the multiple original color gamut matrices is associated with a target color gamut, coordinates that indicate a corresponding pixel of the display device 600 to display a converted color gamut matrix associated with the original color gamut matrix, and a priority. A controller (e.g., the controller 104, 304, 502) may utilize the priority to determine a first original color gamut matrix has a higher priority than a second original color gamut matrix, where the first and the second original color gamut matrices are associated with a same corresponding pixel. In other examples, the controller may determine priorities for the areas 602, 604, 606 of the display device 600.

In other examples, the controller may determine an area having a fixed location (e.g., the area 606) has a higher priority than the priority of the first or the second original color gamut matrix. For example, the controller may determine the first and the second original color gamut matrices are associated with a pixel of the area 606. The controller may receive a priority of 1 on a scale of 1 to 10 for the first original color gamut matrix and a priority of 2 for the second original color gamut matrix. The controller may determine that a priority of the area 606 having a fixed location has a higher priority than the first and the second original color gamut matrices. The controller may determine a color conversion for the first original color gamut matrix utilizing a color gamut associated with the area 606 as the target color gamut. The controller may generate a converted color gamut matrix for the first original color gamut matrix based on the color conversion. The controller may cause the display device 600 to display the converted color gamut matrix at the coordinates for the first color gamut matrix. For example, the image 608 may have a first target color gamut. The controller may determine a portion of the image 608 that overlaps the area 606 may have a second target color gamut that is the color gamut associated with the area 606. The controller causes the display device 600 to display a non-overlapping portion of the image 608 utilizing the first target color gamut and the overlapping portion of the image 608 utilizing the second target color gamut.

An electronic device comprising the display device 500, 600 that supports displaying images having different color gamuts in different areas of the display device 500, 600 improves color accuracy of the displayed images. The resulting color accuracy improves the user experience and allows for the creation of an image in one color gamut without requiring foreknowledge of an operational color gamut of the display device 500, 600 with which to later display the image.

While in various examples, the controller (e.g., the controller 104, 304, 502) is a controller of a display device (e.g., the display device 100, 300, 500), as described above, the controller may be a GPU of an electronic device that comprises the display device. The display device may be an in-built display device of the electronic device, a display device coupled to the electronic device via a wired connection (e.g., Universal Serial Bus (USB)), Video Graphics Array (VGA), Digital Visual Interface (DVI), High-Definition Multimedia Interface (HDMI)), or a stand-alone display device coupled to the electronic device via a wireless connection (e.g., WI-FI®, BLUETOOTH®). The electronic device may comprise a storage device (e.g., the storage device 106, 306, the non-transitory machine-readable medium 504) storing machine-readable instructions (e.g., the machine-readable instructions 132, 134, 136, 310, 312, 314, 316, 506, 508), which, when executed by the GPU, may cause the GPU to perform some or all of the actions attributed herein to the controller. For example, the GPU may receive an original color gamut matrix (e.g., machine-readable instruction 310). The GPU may determine a color conversion based on the original color gamut matrix and the target color gamut (e.g., machine-readable instruction 312). The GPU may generate a converted color gamut matrix based on the color conversion (e.g., machine-readable instruction 314). The GPU may cause a light source (e.g., the light source 112, 114, 116, 118, 120, 122, 124, 126, 128, 130, 318, 320, 322, 324, 326, 328, 330, 332, 334, 336) of a display panel (e.g., the display panel 102, 302) of the display device to display an image using the converted color gamut matrix. In some examples, the GPU may transmit the converted color gamut matrix to a TCON (e.g., the controller 104, 304, 502) of the display device (e.g., the display device 100, 300, 500). The controller of the display device may cause the light source of the display panel of the display device to display an image using the converted color gamut matrix.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. A display device, comprising:

a display panel; and a controller coupled to the display panel, the controller to:

receive a first original color gamut matrix and a target color gamut, the target color gamut is a first target color gamut of multiple color gamuts;

receive a first priority and a first coordinate indicated by the first original color gamut matrix, the first coordinate associated with a pixel of an image;

determine a first color conversion based on the first original color gamut matrix and the first target color gamut;

generate a first converted color gamut matrix based on the first color conversion, the first converted color gamut matrix based on the first color gamut of the multiple color gamuts;

cause a light source of the display panel to display the pixel of the image using the first converted color gamut matrix;

receive a second original color gamut matrix and a second target color gamut, the second target color gamut being a second color gamut of the multiple color gamuts, the first color gamut being different than the second color gamut;

receive a second priority, and a second coordinate indicated by the second original color gamut matrix, the second coordinate associated with the pixel of the image;

determine that the second priority is higher than the first priority;

determine a second color conversion based on the second original color gamut matrix and the second target color gamut;

generate a second converted color gamut matrix based on the second color conversion; and cause a second light source of the display panel to display a second pixel of the image using the second converted color gamut matrix.

2. The display device of claim 1, wherein the display panel is capable of displaying the multiple color gamuts.

3. The display device of claim 1, wherein the display panel is capable of displaying the multiple color gamuts simultaneously.

4. The display device of claim 1, wherein a first color gamut of the multiple color gamuts is a wide-spectrum color gamut in comparison to a second color gamut of the multiple color gamuts.

5. The display device of claim 4, wherein the first and the second color gamuts are governed by a first and a second color gamut standard, respectively, and wherein the first or the second color gamut standard is:

National Television Standards Committee (NTSC) 45%, NTSC 72%, standard Red Green Blue (sRGB), ADOBE® Red Green Blue (ADOBE® RGB), ADOBE® Wide Gamut Red Green Blue (ADOBE® Wide Gamut RGB), Digital Cinema Initiatives—Protocol 3 (DCI-P3), International Telecommunication Union (ITU) BT.2020,

ITC BT.709,

Society of Motion Picture and Television Engineers-C (SMPTE-C), or

European Broadcasting Union (EBU).

6. The display device of claim 1, wherein the light source is a light-emitting diode (LED), an organic LED (OLED), a microLED, a quantum dot (QD)-LED (QD-LED), a QD-OLED, or a QD-microLED.

7. The display device of claim 1, wherein the controller is further configured to:

determine the first color conversion, based on the first priority being higher than the second priority; and determine the second color conversion, based on the first priority being higher than the second priority.

8. A display device, comprising:

a display panel having first and second areas, the first area having a first light source and the second area having a second light source, wherein the display panel has a third area having the first light source; and a controller coupled to the display panel, the controller to:

cause the display panel to display a first image in the first area using the first light source and a first color gamut matrix;

cause the display panel to display the first image in the second area using the second light source and the first color gamut matrix;

cause the display panel to display a second image in the first area using the first light source and a second color gamut matrix;

determine a third image for display in the third area has a higher priority than a priority of the first image for display in the first area; and cause the display panel to display the third image in the third area using the first light source and a third color gamut matrix.

9. The display device of claim 8, wherein the controller is to cause the display panel to display the first image in a window of a first application and cause the display panel to display the second image in a window of a second application.

10. The display device of claim 8, wherein the controller is to cause the display panel to display the first image in a first window of an application and cause the display panel to display the second image in a second window of the application.

11. The display device of claim 8, wherein the second area is an area of the display panel having a fixed location and a fixed color gamut that is equivalent to a color gamut indicated by the first color gamut matrix.

12. The display device of claim 8, wherein the second area is a first portion of the first area, a second portion of the first area is a remaining portion of the first area, and the controller is to cause the display panel to display a set of pixels of the second image in the second portion of the first area using the first light source and the second color gamut matrix.

13. The display device of claim 8, wherein the controller is further configured to:

cause the display panel to display the first image in the second area when the display panel displays the second image in the first area.

14. A display device comprising: a display panel; and a controller coupled to the display panel, the controller to: cause the display panel to display at least a first portion of an image in a first area of the display panel according to a first color gamut; and when the first portion of the image in the first area is displayed, cause the display panel to display a second portion of the image in a second area of the display panel according to a second color gamut, the first color gamut being different than the second color gamut; and a second image in a third area of the display panel according to a third color gamut, the third color gamut being different than the first color gamut.

15. The display device of claim 14, wherein the controller is further to:

receive an original color gamut matrix and a target color gamut that is the second color gamut;

determine a color conversion based on the original color gamut matrix and the target color gamut;

generate a converted color gamut matrix based on the color conversion; and cause the display panel to display the first portion of the image using the converted color gamut matrix.

16. The display device of claim 14, wherein the first color gamut and the second color gamut are governed by a first color gamut standard and a second color gamut standard, respectively, and wherein the first or the second color gamut standard is:

National Television Standards Committee (NTSC) 45%, NTSC 72%, standard Red Green Blue (sRGB), ADOBE® Red Green Blue (ADOBE® RGB), ADOBE® Wide Gamut Red Green Blue (ADOBE® Wide Gamut RGB), Digital Cinema Initiatives—Protocol 3 (DCI-P3), International Telecommunication Union (ITU) BT.2020,

ITC BT.709,

Society of Motion Picture and Television Engineers-C (SMPTE-C), or

European Broadcasting Union (EBU).

17. The display device of claim 14, wherein the display device includes a first subset of multiple light sources and a second subset of the multiple light sources;

wherein the first subset of the multiple light sources is a first set of pixels for an area of the display device; and wherein the second subset of the multiple light sources is a second set of pixels for the area, the first set of pixels non-overlapping with the second set of pixels.

* * * * *